July 9, 1968 H. J. ROSENER 3,392,372

PARITY CHECKING CIRCUIT

Filed Nov. 27, 1964 2 Sheets-Sheet 1

INVENTOR.
Harvey J. Rosener

BY Hill, Sherman, Meroni, Gross & Simpson
ATTORNEYS

July 9, 1968 H. J. ROSENER 3,392,372

PARITY CHECKING CIRCUIT

Filed Nov. 27, 1964 2 Sheets-Sheet 2

INVENTOR.

Harvey J. Rosener

BY Hill, Sherman, Meroni, Gross & Simpson ATTORNEYS

United States Patent Office 3,392,372

Patented July 9, 1968

3,392,372

PARITY CHECKING CIRCUIT

Harvey J. Rosener, Dayton, Ohio, assignor, by mesne assignments, to The Bunker-Ramo Corporation, Stamford, Conn., a corporation of Delaware Filed Nov. 27, 1964, Ser. No. 414,255
3 Claims. (Cl. 340—146.1)

ABSTRACT OF THE DISCLOSURE

A parity checking circuit with a unitary weighted digital to analog converter providing a parity check voltage proportional to the number of "one" bits in a coded input, a capacitor step circuit generating a staircase waveform in response to a series of pulses, and a bistable circuit responding to each pulse required to produce equality between the parity check voltage and the amplitude of the staircase waveform to indicate whether the number of such pulses and thus the number of "one" bits is even or odd.

This invention relates generally to a code error checking system and more particularly to a parity checking circuit for generating a signal in response to an error in parity of code signals being generated by a tape reader or the like.

Parity checking is well known in the digital processing art and is considered a vital function for maintenance of the integrity of a computer system. Therefore, it is desirable to maintain an accurate input to the computer or register by discovering any error which might exist in the reading of digital information from a storage medium or the like. When an error is discovered or realized, a signal is generated in accordance with such error. The error signal can be employed for stopping the computation process until correction is made, or to give some other suitable indication that an error exists.

It is an object of the present invention to provide an accurate, simple, and improved parity checking circuit for detecting errors that exist and generating a signal in accordance with such error.

It is a further object of the present invention to provide a parity checking system which senses bits of information as read from an information medium and provides either an error signal corresponding to an error in the coded information or a gating signal for transmitting the information to a computer or register.

It is another object of the present invention to provide a highly economical parity checking system which provides an indication of the authenticity of each character or word generated by a tape reader or the like.

Another object of this invention is to provide a method of checking coded information prior to utilization thereof in a digital control system or the like.

Still another object of the instant invention is to provide a parity checking system which employs a minimum number of components and yet affords a high degree of reliability and accuracy.

An appreciation of further objects and novel features of the invention as well as a better understanding of the invention may be had from the following detailed description when taken in conjunction with the accompanying drawings, in which.

Figures 1, 2, 3, 4:
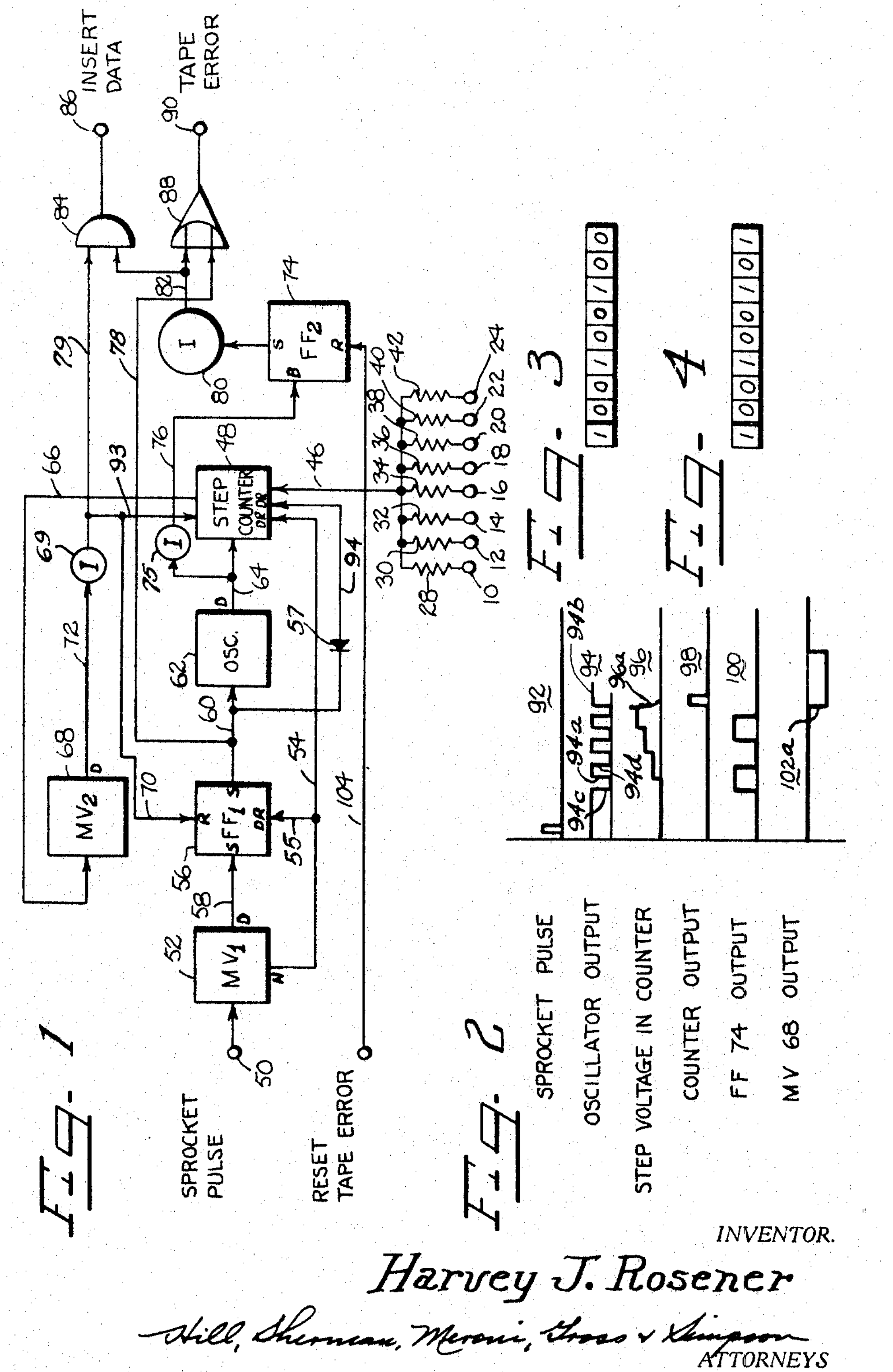
FIGURE 1 is a block diagram of a parity checking system in accordance with the present invention.
FIGURE 2 is a waveform table illustrating the sequence of operation of the parity checking system shown in FIGURE 1.
FIGURE 3 is a diagram showing a series of code positions which may be arranged transversely of an input medium, and indicating the case where there are an odd number of code bits, representing a valid input in an odd parity checking system.
FIGURE 4 is another diagram similar to FIGURE 3 but indicating the presence of an even number of code bits.

With particular reference to FIGURE 1, there is shown one embodiment of a parity checking system constructed and arranged in accordance with the principles of the present invention. Coded information is applied to a plurality of terminals designated by reference numerals 10, 12, 14, 16, 18, 20, 22 and 24. Each of the terminals is connected through a respective one of a plurality of resistors 28, 30, 32, 34, 36, 38, 40 and 42 to an input line 46. Each of the input terminals is arranged to receive a signal in accordance with the presence or absence of a bit in a particular code position of a series of eight code positions such as indicated in FIGURES 3 and 4.

By way of example, the input terminals may be connected to the output terminals of a conventional photoelectric tape reader or the like. Suitable buffering amplifiers or the like may be interposed between each tape reader terminal and the associated input terminal to supply voltages of the desired amplitude and polarity to the respective input terminals. Suitable inputs for the circuit of FIGURE 1 may also be derived from various other locations in a computer or numerical control system or the like.

As shown in FIGURES 3 and 4, each code position contains either a "1" or a "0." Each "1" may provide a "high" input signal to a respective input terminal and each "0" may provide a "low" input signal to a respective input terminal. Therefore, if the row of code positions shown in FIGURE 3 were being checked by the circuit of FIGURE 1, input terminals 10, 16 and 20 would receive a "high" signal and input terminals 12, 14, 18, 22 and 24 would receive a "low" signal. The "high" signals are additive through the respective resistors, and the total input signal on line 46 is thus proportional to the number of "1" signals present. This input signal is applied to a step counter 48 and provides a limit to the number of steps or counts which can be performed by the step counter. The step counter 48 may be any one of a type well known in the art and which are commonly referred to as "storage counters."

A sprocket or other starting pulse is applied to a terminal 50. A monostable multivibrator 52 is triggered in response to the sprocket pulse at terminal 50 and provides a positive going "normal" or N output which is applied via a line 54 to a direct coupled reset (DR) input of the step counter 48 for insuring that the counter is in its initial state ready for a cycle of operation. Flip-flop 56 also receives a reset signal from line 54 as indicated at 55. With flip-flop 56 reset, the set output thereof is low and this low condition is transmitted through diode 57 to maintain the reset condition of the counter. A delayed output of the multivibrator 52 triggers flip-flop circuit 56 through a line 58 after a suitable time delay. The flip-flop 56 is bistable having two stable operating states. When the flip-flop 56 is triggered to an "on" or "set" state, the positive-going output signal therefrom on line 60 activates an oscillator 62 which has a delayed output connected through a line 64 to the step counter 48.

The oscillator 62 provides a waveform 94 as indicated in FIGURE 2 to the step counter 48 and actuates the step counter to generate a step in the waveform 96 for each successive positive going pulse such as 94*a*. Each step or voltage increment generated by the step counter 48 may be substantially equal to the voltage increment produced in the counter circuit by the presence of one active input to the line 46. Preferably, the oscillator 62 will step the step counter 48 through a number of steps equal to the number of "high" or active input terminals associated with input line 46.

When the step counter 48 has been stepped to the limit provided by the input signal on the input line 46, an output signal appears on a line 66 (for example in response to the beginning of the next voltage step) which serves to trigger a monostable multivibrator 68. A delayed output of the multivibrator 68 on line 72 is converted to a normal output by inverter 69. The output of inverter 69 triggers the flip-flop 56 through a line 70 to an "off" or "reset" condition. When the flip-flop 56 is triggered to reset condition, the oscillator 62 may be stopped as indicated at 94*b* in FIGURE 2.

The pulses from the oscillator 62 are also directed to a flip-flop 74 through an inverter 75 and a line 76. Since the flip-flop 74 has two stable states, it performs a "divide by two" function to provide an output waveform 100, FIGURE 2. That is, the first negative-going pulse 94*c*, FIGURE 2, from the oscillator 62 is inverted by inverter 75 and triggers the flip-flop 74 to an "on" condition or "set" condition, the second negative-going pulse 94*d* triggers it to an "off" condition, the third negative-going pulse triggers it to an "on" or "set" condition again, and so on with each successive negative-going pulse from oscillator 62.

After the step counter 48 triggers the multivibrator 68 which in turn triggers the flip-flop 56 to an "off" or "reset" condition via line 70, a "low" signal will be applied to a line 78. The output from the multivibrator 68 at this time, however, provides a "high" signal on the line 79 because of the presence of inverter 69.

An inverter 80 is connected to a set output of the flip-flop 74 and inverts the signal therefrom and applies it to a line 82. Therefore, when the flip-flop 74 is in an "on" or "set" condition, a "low" signal appears on the line 82; and when the flip-flop 74 is in an "off" or "reset" condition, a "high" signal appears on the line 82.

An insert data gate 84 is connected to the lines 79 and 82 and requires a "high" signal on both of these lines to provide an output gating signal at a terminal 86. If the inputs to the insert data gate 84 are not both "high," the output at terminal 86 will remain in a "low" state. A NOR gate 88 is connected to lines 78 and 82 and provides a tape error output signal (that is a "high" signal) at a terminal 90 when the signals on the lines 78 and 82 are both in a "low" state.

The outputs of terminals 86 and 90 may be employed to control the input of information to either the input of a computer or other digital system or to the input of a succeeding stage within the system. In the illustrated embodiment, when an odd number of "1" bits are sensed by the input terminals in FIGURE 1, a gating signal will appear at the insert data terminal 86; and when an even number of "1" bits are sensed by the input terminals, a tape error signal will appear at the output terminal 90. The illustrated embodiment thus requires that each row of code positions contains an odd number of "1" bits.

OPERATION

A better understanding of the operation of the parity checking system may be had by making reference to specific examples. If the information to be fed either to an input of a digital system or to a succeeding stage therein is as shown in FIGURE 3, the waveforms of FIGURE 2 will apply to the parity checking system. The information represented in FIGURE 3 includes an odd number of "1" bits. Let it be assumed that each "1" bit provides a voltage increment of two volts within the step counter. Then for the example shown in FIGURE 3, a signal will appear in the step counter having a value of 6 volts. When a sprocket or other starting pulse 92 is applied to the terminal 50, the multivibrator 52 is triggered to the "on" condition for a predetermined time delay interval. The delayed positive going output of the multivibrator 52 triggers the flip-flop 56 to an "on" or "set" condition. The flip-flop 56 causes the oscillator 62 to provide pulses to the step counter 48 until such time as the step counter waveform 96 reaches a voltage value exceeding the level determined by the input signal on the line 46 and produces an output pulse. This sequence is shown in FIGURE 2 by the oscillator output wave designated with the reference numeral 94, the step counter voltage wave indicated by the reference numeral 96, and the counter output indicated by the reference numeral 98. Pulse 98 triggers the multivibrator 68 to an "on" condition to produce a "high" signal on the line 79 and on the line 70. Waveform 94 on the line 64 causes the flip-flop 74 to perform a "divide by two" function and produce a waveform as indicated by the reference numeral 100. More specifically each successive negative going pulse from oscillator 62 causes the flip-flop 74 to change its state, so that the flip-flop 74 alternates between a set and a reset condition.

In this particular example, the oscillator 62 will provide four positive-going and four negative-going pulses before being cut off by the flip-flop 56. Therefore, the output from flip-flop 74 will be in a "low" state. This output will be inverted by the inverter 80 to produce a "high" signal on the line 82. Since the signal on the line 82 is in a "high" state, the NOR gate 88 will provide a low output to the terminal 90. However, since the signal on the line 72 is as indicated by the waveform 102, and is inverted by inverter 69, insert data gate 84 will provide a gating signal on the terminal 86. When a gating signal occurs on the terminal 86, it may be employed to initiate transfer of data or information into a digital storage or from one stage to another stage of a digital system.

The coded information shown in FIGURE 4 includes a character having four "1" bits. In this instance, an error was introduced when the information was recorded on or read from the information medium, since an even number of "1" bits are present. This error can be introduced either during the recording or reading of such information, or in a particular stage of a computer or other system. When the input terminals of FIGURE 1 sense the information diagrammatically shown in FIGURE 4, the parity system will perform as described in the previous example with the exception that the oscillator 62 will be allowed to produce one more negative-going pulse and one more positive-going pulse. The additional negative-going pulse causes the flip-flop 74 to be triggered to a "set" state which is inverted by the inverter 80 to a "low" signal on the line 82. Since there now exists two "low" signals at the NOR gate 88, a tape error signal (a "high" signal) will appear at the terminal 90. This tape error signal may be employed for disabling further operations of the system until the error is corrected.

Since the flip-flop 74 remains in a set condition when a tape error exists, a reset is provided for the flip-flop 74 through a line 104.

It is apparent that for the illustrated embodiment when an odd number of "1" bits exists, an output will be realized at the terminal 86. However, whenever an even number of "1" bits exist, a tape error signal will be produced at the terminal 90. By omitting inverter 80 or by adding a second inverter in series therewith, the system of FIGURE 1 can be adapted to use with an even parity code. It may be noted that for an odd parity code a "1" parity bit must be added when an even number of "1" bits would otherwise represent a given character or word.

Figure 5:
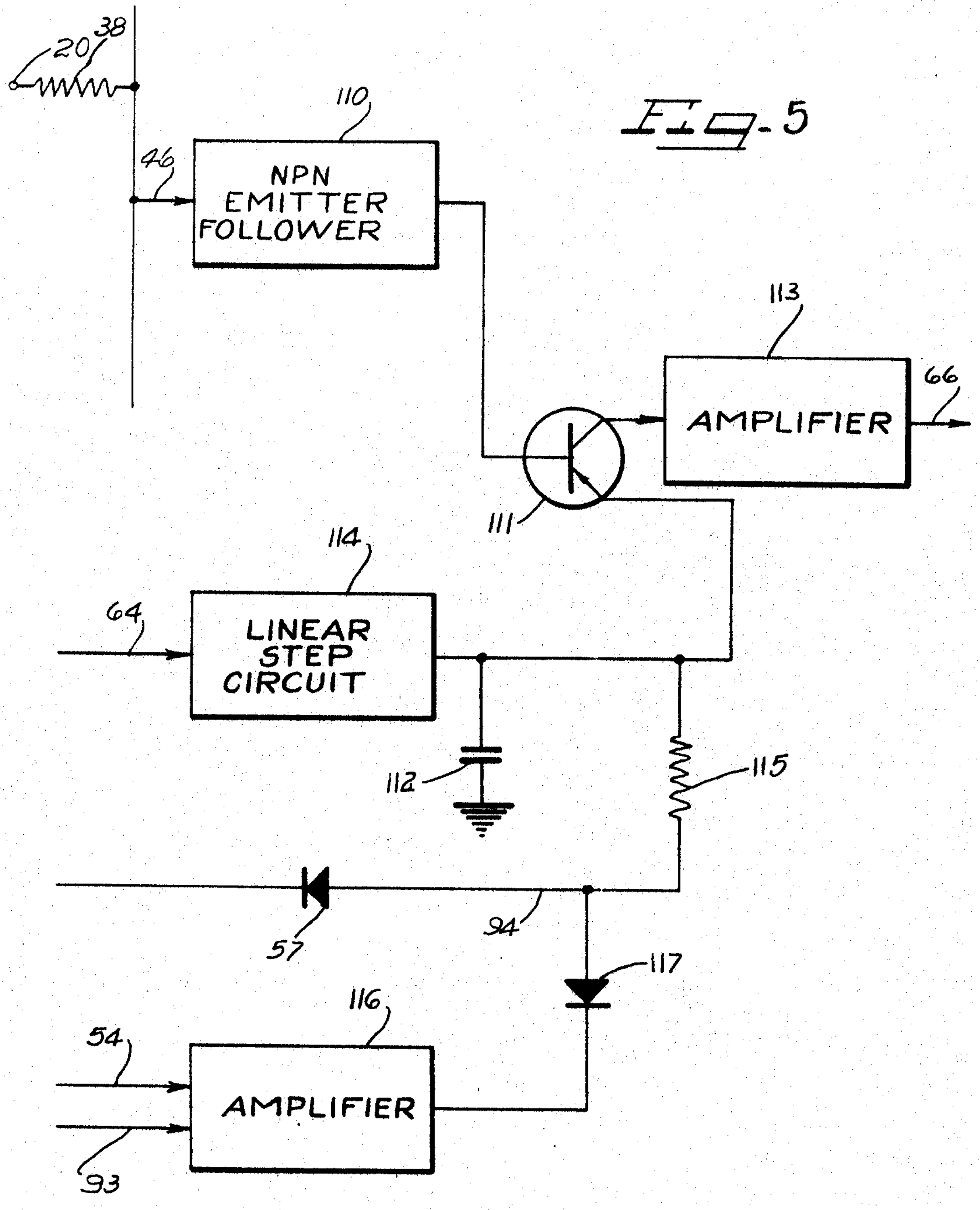
FIG. 5 shows a preferred embodiment of the step counter of FIG. 1.

From the foregoing discussion, it will be understood that the method of the present invention broadly comprises generating a parity check voltage at line 46 proportional to the number of bits in a digitally coded number such as represented in FIGURE 3 or FIGURE 4, generating a comparison voltage of staircase waveform such as indicated at 96 in FIGURE 2 with the successive voltage steps therein having respective predetermined voltage values (such as equal voltage values corresponding to the voltage increment produced in the step counter by the presence of a "one" in a code position), and sensing the number of successive voltage steps required to provide a value of said comparison voltage bearing a fixed relationship (such as equality) to the value of the parity check voltage. In the preferred embodiment, it is contemplated that the successive voltage steps of the waveform 96 will be equal and have a voltage value of about 2 volts. Correspondingly, a one bit in the first code position as illustrated in FIGURE 3 may provide a "high" voltage condition at terminal 20 which by itself would produce a parity check voltage within the step counter 48 of about 2 volts. For example, line 46 may connect with an NPN emitter follower 110, FIG. 5, so that the emitter follower circuit generates a parity checking voltage in proportion to the number of input terminals 10, 12, 14, 16, 18, 20, 22 and 24 which are activated. A PNP transistor stage 111 may have its emitter terminal connected with a storage capacitor 112 of the step counter so as to receive directly the step or staircase waveform 96 of FIGURE 2. The emitter follower circuit 110 having the analog voltage proportional to the number of active input terminals may be coupled to the base terminal of the sensing transistor 111 so that the sensing transistor becomes conductive as soon as the staircase waveform 96 applied to the emitter terminal exceeds the parity check voltage applied to the base terminal. The signal generated by the conduction of the sensing transistor 111 may be amplified by component 113 and supplied to the output line 66 as a positive-going signal.

Where the positive-going pulses such as 94*a* in FIGURE 2 are supplied to the storage capacitor 112 of the step counter, a suitable bootstrap or linear step circuit 114 may be provided so that the successive increments of charge delivered to the storage capacitor 112 will be substantially equal, to provide substantially equal voltage steps of the waveform 96.

The "DR" or direct coupled reset terminals of the step counter provide for the discharge of the storage capacitor. Thus, diode 57 may be connected to the storage capacitor through a suitable resistor 115 of relatively low value. The reset lines 54 and 93 may each be coupled to the input of a suitable amplifier stage 116 which in response to a positive input signal essentially supplies a ground potential through a suitable diode 117 to line 94 so as to discharge the storage capacitor of the step counter.

The oscillator 62 may be a conventional free running multivibrator with line 60 connected so as to initiate oscillation in response to a positive-going pulse and to maintain oscillation so long as a "high" voltage is supplied to the line 60 from the flip-flop 56.

The particular circuitry illustrated in FIGURE 1 is based on the use of "positive logic." With positive logic, positive going pulses are required to trigger the multivibrators, flip-flops, oscillator 62 and step counter 48. Of course, so-called "negative logic" could be employed.

NOTATION

In the illustrated logic diagram, the symbol "N" is utilized to indicate a normal output of a multivibrator, that is an output which is initially positive-going when the input thereof is triggered. The symbol "D" stands for a delayed output of a multivibrator or oscillator wherein the output is initially negative-going, for example as illustrated for the multivibrator 68 at 102*a* in FIGURE 2. The symbol "S" represents either a set input of a flip-flop meaning that the flip-flop may be "set" but not reset by an input signal, or in the case of a set output, that a "high" signal will be presented when the flip-flop is in "set" condition. The symbol "B" as flip-flop 74 signifies that a positive-going pulse will change the state of the flip-flop whether the flip-flop is initially set or initially reset. The symbol "R" indicates a pulse-operated reset terminal of a flip-flop, while the symbol "DR" indicates a direct coupled reset terminal of the flip-flop or of the step counter.

MODIFICATIONS

It will be apparent that many modifications may be effected in the illustrated circuit. For example, it is not essential that the successive steps of the staircase waveform 96 be equal. Further, the output signal from the step counter 48 may be triggered in response to any desired relationship between the parity check voltage and the comparison voltage of the staircase waveform, so long as even numbers of active terminals produce outputs at distinguishable times as compared with the case where an odd number of input terminals are active.

FIGURES 3 and 4 best illustrate the situation wherein a paper tape has a series of 8 code positions thereacross, four on each side of a center sprocket hole. The "1" bits may be represented by actual holes in the tape or any similar distinguishable mark on the tape. It will be apparent, however, that the series of code positions may extend in the lengthwise direction with respect to the direction of movement of the tape or other record medium, so that the holes or other marks along a single channel of the record medium may be registered and control the activation of the respective input terminals of the circuit of FIGURE 1.

While with the operation specifically illustrated in FIGURE 2, the waveform 96 is shown as beginning a fourth step, before interrupting actuation of the bistable means 74, the step counter could be arranged so as to transmit an output signal to line 66 as soon as the third step was reached. Further, the step counter could make two or more steps before generating a voltage increment corresponding to the voltage increment introduced by one active input terminal. Accordingly, the exact number of steps of the step counter is not required to be equal to the number of active input terminals, but is only required to be a uniform function thereof. Further, of course, the step counter need not be interrupted as illustrated at 96*a* in FIGURE 2 but could continue through a cycle of 9 steps, for example, since it is only required in the illustrated embodiment that the negative-going pulses 94*c* from oscillator 62 to flip-flop 74 be interrupted. Such interruption could, of course, be accomplished by an "AND" gate in line 76, for example, which gate could block the pulses from the oscillator in response to an output signal from the step counter.

The principles of the invention explained in connection with the illustrated embodiment will suggest many other applications and modifications of the same. It is accordingly desired that, in construing the breadth of the appended claims, they shall not be limited to the specific details shown and described.

I claim as my invention:

1. A parity checking circuit comprising (a) means comprising a plurality of input terminals for coupling to respective ones of a series of code positions to generate an input signal proportional to the number of code positions having a given condition, (b) a step counter connected to said input terminals for control by said input signal to generate an output signal after a number of steps proportional to said input signal, (c) an oscillator having an output connected to said step counter for supplying successive pulses thereto to actuate the counter through successive steps, (d) bistable means having an input thereof connected to said oscillator for actuation thereof alternately to a set state and a reset state, (e) means responsive to said output signal of said step counter for interrupting actuation of said bistable means by said oscillator, and (f) gating means differentially responsive to said set state and to said reset state respectively of said bistable means for producing one of an error signal and a gating signal in accordance with whether the number of code positions having said given condition is even or odd.

2. Apparatus for checking the parity of a digitally-coded signal which for validity is required to have either an even or odd number of "one" bits, comprising (a) means for generating a parity check voltage proportional to the number of "one" bits in said coded signal, (b) means comprising an energy storage circuit for generating a comparison voltage of staircase waveform, (c) means connected with said energy storage circuit for supplying a series of pulses thereto, (d) comparison means connected to said parity check voltage generating means and to said energy storage circuit and being responsive to the parity check voltage and the comparison voltage for actuation when the comparison voltage reaches a value corresponding to said parity check voltage, (e) means connected to said pulse supplying means and responsive to the pulses therefrom to signal whether the pulses required for actuation of said comparison means is even or odd, and (f) said energy storage circuit comprising a capacitor for storing successive increments of electric charge in response to the successive pulses from the pulse supplying means to generate said comparison voltage of staircase waveform.

3. In an apparatus for checking the parity of a digitally coded signal including means for generating a parity check voltage substantially linearly proportional to the number of "one" bits in said coded signal, said apparatus further comprising (a) an energy storage step counter circuit including a charge storage capacitor for generating a comparison voltage of staircase waveform across the capacitor with each of the incremental voltage steps of the staircase waveform being substantially equal to the weight assigned to each "one" bit in generating said parity check voltage, (b) means connected to said energy storage circuit for supplying a series of pulses thereto to supply successive electric charge increments to said charge storage capacitor producing the successive incremental voltage steps of said staircase waveform, (c) said energy storage step-counter circuit being connected to said parity check voltage generating means and being responsive to the parity check voltage therefrom for actuation to transmit an output signal when the comparison voltage generated across the charge storage capacitor corresponds to said parity check voltage, and (d) means consisting essentially of a single bistable circuit coupled with said supplying means for sensing whether the number of pulses required to actuate said energy storage step counter is even or odd, thereby to determine the validity of said digitally coded signal.

References Cited

UNITED STATES PATENTS

| | | | |
|---|---|---|---|
| 2,675,539 | 4/1954 | McGuigan | 340—149 |
| 3,021,063 | 2/1962 | Von Kummer | 235—153 |
| 3,255,622 | 6/1966 | Ault | 235—153 |

MALCOLM A. MORRISON, *Primary Examiner.*

C. E. ATKINSON, *Assistant Examiner.*